United States Patent
Zhang et al.

(10) Patent No.: US 11,694,359 B2
(45) Date of Patent: Jul. 4, 2023

(54) METHOD AND APPARATUS FOR CALIBRATING CAMERA

(71) Applicant: Apollo Intelligent Driving Technology (Beijing) Co., Ltd., Beijing (CN)

(72) Inventors: Shuang Zhang, Beijing (CN); Xiang Liu, Beijing (CN); Bin Gao, Beijing (CN); Xiaoxing Zhu, Beijing (CN); Fan Yang, Beijing (CN); Junping Wang, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 203 days.

(21) Appl. No.: 16/914,121

(22) Filed: Jun. 26, 2020

(65) Prior Publication Data
US 2021/0090296 A1 Mar. 25, 2021

(30) Foreign Application Priority Data
Sep. 20, 2019 (CN) .......................... 201910890571.X

(51) Int. Cl.
*G06T 7/80* (2017.01)
*G06T 7/246* (2017.01)
(Continued)

(52) U.S. Cl.
CPC .............. *G06T 7/80* (2017.01); *B60W 50/06* (2013.01); *B60W 60/0025* (2020.02);
(Continued)

(58) Field of Classification Search
CPC . G06T 7/80; G06T 7/246; G06T 2207/10028; G06T 2207/30252;
(Continued)

(56) References Cited

U.S. PATENT DOCUMENTS 9,215,382 B1 * 12/2015 Hilde .................. G01S 17/86
9,221,396 B1 * 12/2015 Zhu .................... G01S 17/86
(Continued)

FOREIGN PATENT DOCUMENTS

CN 109920011 A 6/2019
CN 109949371 A 6/2019
(Continued)

OTHER PUBLICATIONS

Napier, Ashely, et al., "Cross-Calibration of Push-Broom 2D LIDARs and Cameras in Natural Scenes," 2013 IEEE Conference on Robotics and Automation pp. 1-6 (Oct. 17, 2013).
(Continued)

*Primary Examiner* — Yazan A Soofi
*Assistant Examiner* — Naeem Taslim Alam
(74) *Attorney, Agent, or Firm* — Kilpatrick Townsend & Stockton LLP

(57) ABSTRACT

A method and apparatus for calibrating a camera are provided. A specific embodiment of the method includes: acquiring an image-point cloud sequence, the image-point cloud sequence including at least one group of an initial image and point cloud data collected at a same time, the initial image being collected by a camera provided on an autonomous vehicle and the point cloud data being collected by a radar provided on the autonomous vehicle; determining target point cloud data of initial images corresponding to groups of image-point cloud in the image-point cloud sequence; and matching the target point cloud data with the corresponding initial images in the image-point cloud sequence to determine a correction parameter of the camera.

20 Claims, 6 Drawing Sheets

(51) Int. Cl.
*B60W 60/00* (2020.01)
*B60W 50/06* (2006.01)
(52) U.S. Cl.
CPC ......... *G06T 7/246* (2017.01); *B60W 2420/42* (2013.01); *B60W 2420/52* (2013.01); *G06T 2207/10028* (2013.01); *G06T 2207/30252* (2013.01)
(58) Field of Classification Search
CPC ............ B60W 60/0025; B60W 50/06; B60W 2420/42; B60W 2420/52
See application file for complete search history.

(56) References Cited

U.S. PATENT DOCUMENTS

| | | | |
|---|---|---|---|
| 10,298,910 | B1 | 5/2019 | Kroeger |
| 10,408,939 | B1* | 9/2019 | Kim ........................ G01S 17/86 |
| 10,509,983 | B2 | 12/2019 | Sasaki et al. |
| 10,841,483 | B1* | 11/2020 | Hunt ...................... G06T 3/0068 |
| 10,984,543 | B1* | 4/2021 | Srinivasan ............ G06V 20/56 |
| 11,256,268 | B1* | 2/2022 | Bojinov ............... G05D 1/0291 |
| 2003/0236622 | A1* | 12/2003 | Schofield ............... G01C 21/12 340/995.28 |
| 2009/0005961 | A1* | 1/2009 | Grabowski ........ G02B 27/0101 701/532 |
| 2010/0296705 | A1* | 11/2010 | Miksa ...................... G06T 5/005 382/106 |
| 2013/0226407 | A1* | 8/2013 | Rentschler ............ B60W 30/16 701/41 |
| 2017/0314954 | A1* | 11/2017 | Golding ............. G01C 21/3644 |
| 2018/0196442 | A1* | 7/2018 | Wang .................. G05D 1/0214 |
| 2018/0357503 | A1 | 12/2018 | Wang et al. |
| 2019/0120934 | A1* | 4/2019 | Slutsky ................. G01S 13/931 |
| 2019/0122386 | A1* | 4/2019 | Wheeler .............. H04N 23/689 |
| 2019/0147600 | A1* | 5/2019 | Karasev .................... G06T 7/62 382/107 |
| 2019/0196484 | A1* | 6/2019 | Smit ........................ G01S 5/16 |
| 2019/0212743 | A1* | 7/2019 | Magraner Bonifacio ................... A61G 5/04 |
| 2019/0361436 | A1* | 11/2019 | Ueda ........................ G08G 1/09 |
| 2019/0391254 | A1* | 12/2019 | Asghar .................. H04N 23/60 |
| 2020/0003897 | A1* | 1/2020 | Shroff .................... G01S 7/4808 |
| 2020/0005489 | A1* | 1/2020 | Kroeger ................. G06V 20/56 |
| 2020/0018852 | A1* | 1/2020 | Walls ..................... G01S 17/931 |
| 2020/0026297 | A1* | 1/2020 | Kato .................. G01C 21/3602 |
| 2020/0029490 | A1* | 1/2020 | Bertucci .............. G05D 1/0248 |
| 2020/0174107 | A1* | 6/2020 | Briggs ....................... G06T 7/50 |
| 2020/0186722 | A1* | 6/2020 | Hu ....................... H04N 23/671 |
| 2020/0312057 | A1* | 10/2020 | Kumar ................... G01C 25/00 |
| 2020/0326410 | A1* | 10/2020 | Vu ......................... G01S 13/867 |
| 2020/0326420 | A1* | 10/2020 | Swaminathan ........... G06T 7/70 |
| 2020/0361478 | A1* | 11/2020 | Sakamoto ................ G05B 9/02 |
| 2020/0410715 | A1* | 12/2020 | Cadien ....................... G01S 7/40 |
| 2021/0000006 | A1* | 1/2021 | Ellaboudy ............ A01B 69/008 |
| 2021/0003683 | A1* | 1/2021 | Chen ....................... G01S 17/89 |
| 2021/0046942 | A1* | 2/2021 | Tanaka ................ G06F 11/3058 |
| 2021/0051317 | A1* | 2/2021 | Yan ............................ G06T 7/80 |
| 2021/0097336 | A1* | 4/2021 | Schäfer ................. B60W 30/10 |
| 2021/0237769 | A1* | 8/2021 | Ostafew ................ G08G 1/163 |
| 2021/0270957 | A1* | 9/2021 | Zhu ........................... G06T 7/70 |

FOREIGN PATENT DOCUMENTS

| | | |
|---|---|---|
| EP | 2 728 376 A1 | 5/2014 |
| EP | 3 396 409 A1 | 10/2018 |
| JP | 2016-057108 A | 4/2016 |
| JP | 2017-062848 A | 3/2017 |
| WO | 2019/025035 A1 | 2/2019 |

OTHER PUBLICATIONS

Mingwei, Cao, et al., "Joint calibration of panoramic camera and lidar based on supervised learning," Research Institute of Robotics, Shanghai Jiao Tong University, Shanghai, 200240; Department of Automation, Shanghai Jiao Tong University, 200240; Key Laboratory of System Control and Information Processing, Ministry of Education of China, Shanghai, 200240, pp. 1-5, (Jan. 15, 2018).

* cited by examiner

METHOD AND APPARATUS FOR CALIBRATING CAMERA

CROSS-REFERENCE TO RELATED APPLICATIONS

This application claims priority to Chinese Patent Application No. 201910890571.X, filed with the China National Intellectual Property Administration (CNIPA) on Sep. 20, 2019, the contents of which are incorporated herein by reference in their entirety.

TECHNICAL FIELD

Embodiments of the present disclosure relate to the field of data processing technology, and in particular to, a method and apparatus for calibrating a camera.

BACKGROUND

Vehicles have greatly expanded one's living space, and play an important role in one's daily life and the national economy. The automobile industry has become a mainstay industry of national economy.

With the advancement of technology, current vehicles are provided with various electronic devices, to achieve monitoring various operating states and environmental information of the vehicles, and improve the vehicle security.

SUMMARY

Some embodiments of the preset disclosure provide a method and apparatus for calibrating a camera.

According to a first aspect, some embodiments of the present disclosure provide a method for calibrating a camera, the method including: acquiring an image-point cloud sequence, the image-point cloud sequence including at least one group of an initial image and point cloud data collected at a same time, the initial image being collected by a camera provided on an autonomous vehicle and the point cloud data being collected by a radar provided on the autonomous vehicle; determining target point cloud data of initial images corresponding to groups of image-point cloud in the image-point cloud sequence; and matching the target point cloud data with the corresponding initial images in the image-point cloud sequence, to determine a correction parameter of the camera.

In some embodiments, the image-point cloud sequence is collected through: the autonomous vehicle traveling along a straight line at a constant velocity, the camera provided on the autonomous vehicle collecting images at intervals of set time, and the radar provided on the autonomous vehicle collecting the point cloud data at intervals of said set time.

In some embodiments, the determining target point cloud data of initial images corresponding to groups of image-point cloud in the image-point cloud sequence includes: determining an actual traveling trajectory of the autonomous vehicle based on the image-point cloud sequence; determining location points corresponding to the initial images in the groups of image-point cloud in the image-point cloud sequence on the actual traveling trajectory, to obtain a location point sequence corresponding to the image-point cloud sequence; and for a location point in the location point sequence, acquiring, at the location point, target point cloud data of a corresponding initial image.

In some embodiments, the determining an actual traveling trajectory of the autonomous vehicle based on the image-point cloud sequence includes: determining mark points of the autonomous vehicle in a three-dimensional space based on the point cloud data contained in the groups of image-point cloud in the image-point cloud sequence, to obtain a mark point sequence corresponding to the point cloud data; and fitting the mark points based on sorting of the mark points in the mark point sequence, to obtain the actual traveling trajectory of the autonomous vehicle.

In some embodiments, the determining mark points of the autonomous vehicle in a three-dimensional space based on the point cloud data contained in the groups of image-point cloud in the image-point cloud sequence includes: determining angle information of the point cloud data in the three-dimensional space, and determining the mark points of the autonomous vehicle in the three-dimensional space based on the angle information.

In some embodiments, the determining location points corresponding to the initial images in the groups of image-point cloud in the image-point cloud sequence on the actual traveling trajectory includes: the determining location points corresponding to the initial images in the groups of image-point cloud in the image-point cloud sequence on the actual traveling trajectory.

In some embodiments, the acquiring, at the location point, target point cloud data of a corresponding initial image includes: acquiring the target point cloud data at the mark point in the three-dimensional space.

In some embodiments, the matching the target point cloud data with the corresponding initial images in the image-point cloud sequence to determine a correction parameter of the camera includes: acquiring a feature point set from the initial images; determining, in the target point cloud data, at least one piece of point cloud feature data corresponding to the feature point set; and determining the correction parameter of the camera, based on a locational relationship and an angular relationship between the at least one piece of point cloud feature data.

According to a second aspect, some embodiments of the present disclosure provide an apparatus for calibrating a camera, the apparatus including: an image-point cloud sequence acquiring unit, configured to acquire an image-point cloud sequence, the image-point cloud sequence including at least one group of an initial image and point cloud data collected at a same time, the initial image being collected by a camera provided on an autonomous vehicle, and the point cloud data being collected by a radar provided on the autonomous vehicle; a target point cloud data determining unit, configured to determine target point cloud data of initial images corresponding to groups of image-point cloud in the image-point cloud sequence; and a correction parameter acquiring unit, configured to match the target point cloud data with the corresponding initial images in the image-point cloud sequence, to determine a correction parameter of the camera.

In some embodiments, the image-point cloud sequence is collected through: the autonomous vehicle traveling along a straight line at a constant velocity, the camera provided on the autonomous vehicle collecting images at intervals of set time, and the radar provided on the autonomous vehicle collecting the point cloud data at intervals of said set time.

In some embodiments, the target point cloud data determining unit includes: an actual driving track determining subunit, configured to determine an actual traveling trajectory of the autonomous vehicle based on the image-point cloud sequence; a location point determining subunit, configured to determine location points corresponding to the initial images in the groups of image-point cloud in the image-point cloud sequence on the actual traveling trajectory, to obtain a location point sequence corresponding to the image-point cloud sequence; and a target point cloud data acquiring subunit, configured to acquire, for a location point in the location point sequence, target point cloud data of a corresponding initial image at the location point.

In some embodiments, the actual driving track determining subunit includes: a mark point determining module, configured to determine mark points of the autonomous vehicle in a three-dimensional space based on the point cloud data contained in the groups of image-point cloud in the image-point cloud sequence, to obtain a mark point sequence corresponding to the point cloud data; and an actual driving track fitting module, configured to fit the mark points based on sorting of the mark points in the mark point sequence, to obtain the actual traveling trajectory of the autonomous vehicle.

In some embodiments, the mark point determining module includes: a mark point determining submodule, configured to determine angle information of the point cloud data in the three-dimensional space, and determine the mark points of the autonomous vehicle in the three-dimensional space based on the angle information.

In some embodiments, the location point determining subunit includes: a location point setting module, configured to set a mark point as the location point of the initial image in a corresponding group of image-point cloud.

In some embodiments, the target point cloud data acquiring subunit includes: a target point cloud data acquiring module, configured to acquire the target point cloud data at the mark point in the three-dimensional space.

In some embodiments, the correction parameter acquiring unit includes: a feature point set acquiring subunit, configured to acquire a feature point set from the initial images; a point cloud feature data determining subunit, configured to determine, in the target point cloud data, at least one piece of point cloud feature data corresponding to the feature point set; and a correction parameter determining subunit, configured to determine the correction parameter of the camera based on a locational relationship and an angular relationship between the at least one piece of point cloud feature data.

According to a third aspect, some embodiments of the present disclosure provide an electronic device, including one or more processor; and a memory, storing one or more programs thereon, where the one or more programs, when executed by the one or more processors, cause the one or more processors to execute the method according to the first aspect.

According to a fourth aspect, some embodiments of the present disclosure provide a computer readable medium, storing a computer program thereon, wherein the program, when executed by a processor, cause the processor to perform the method according to the first aspect.

The method and apparatus for calibrating a camera provided by some embodiments of the present disclosure first acquire an image-point cloud sequence; then determine target point cloud data of the initial images corresponding to groups of image-point cloud in the image-point cloud sequence; and finally match the target point cloud data with the corresponding initial images in the image-point cloud sequence, to determine a correction parameter of the camera. Embodiments of the present disclosure can achieve calibrating the camera based on the point cloud data.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
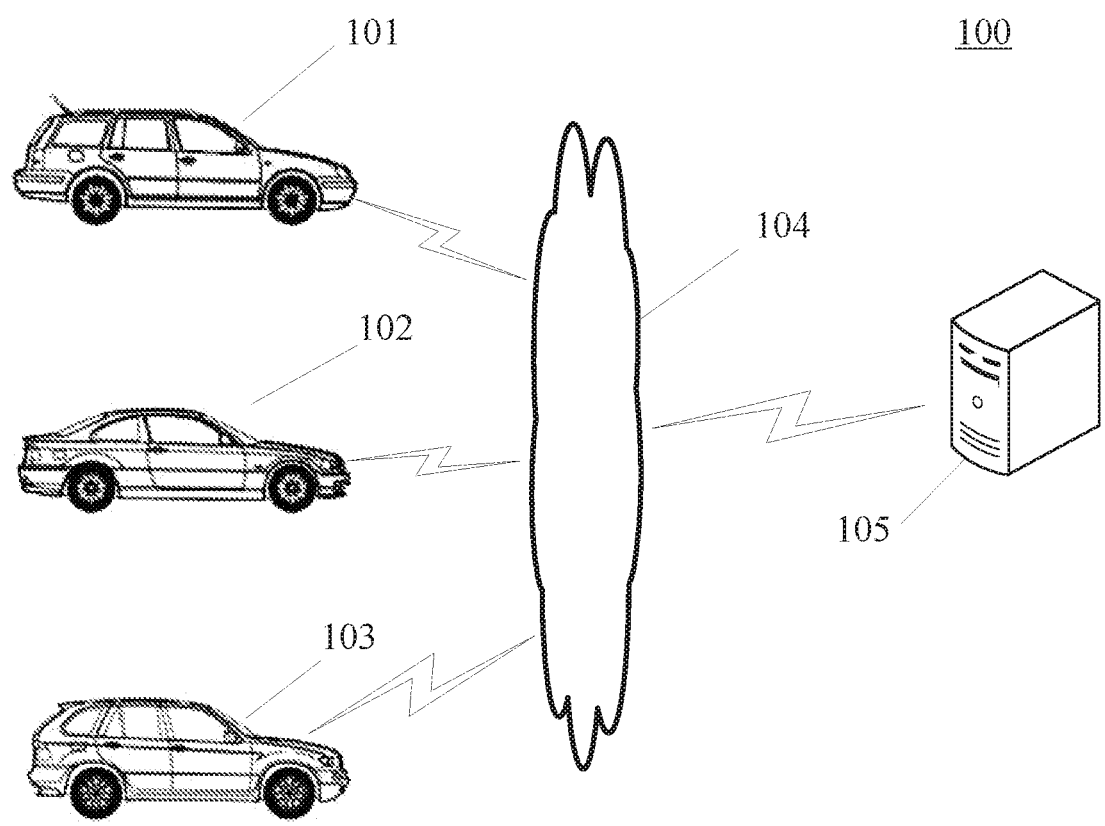
FIG. 1 is a diagram of an example system architecture in which an embodiment of the present disclosure may be implemented.

FIG. 1 shows an example system architecture 100 in which a method for calibrating a camera or an apparatus for calibrating a camera of embodiments of the present disclosure may be implemented.

As shown in FIG. 1, the system architecture 100 may include autonomous vehicles 101, 102, or 103, a network 104, and a server 105. The network 104 serves as a medium providing a communication link between the autonomous vehicles 101, 102, or 103, and the server 105. The network 104 may include various types of connections, such as wired or wireless communication links, or optical cables.

The autonomous vehicles 101, 102, and 103 may be various vehicles having a plurality of data collecting units and data processing units, such as a camera and a radar, including but not limited to electric vehicles, hybrid electric vehicles, internal combustion engine vehicles, and so on.

The server 105 may be a server providing various services, such as a server providing support for an image-point cloud sequence sent by the autonomous vehicles 101, 102, or 103. The server can process, e.g., analyze, received data, such as the image-point cloud sequence, and return a processing result (e.g., a correction parameter of the camera on the autonomous vehicles 101, 102, and 103) to the autonomous vehicles.

It should be noted that the method for calibrating a camera provided by some embodiments of the present disclosure is generally executed by the server 105. Accordingly, the apparatus for calibrating a camera is generally provided in the server 105.

It should be noted that the server may be hardware, or may be software. When the server is hardware, the server may be implemented as a distributed server cluster composed of a plurality of servers, or may be implemented as a single server. When the server is software, the server may be implemented as a plurality of software programs or software modules (e.g., software programs or software modules for providing distributed services), or may be implemented as a single software program or software module. This is not specifically limited here.

It should be understood that the numbers of autonomous vehicles, networks, and servers in FIG. 1 are merely illustrative. Any number of autonomous vehicles, networks, and servers may be provided based on actual requirements.

Figure 2:
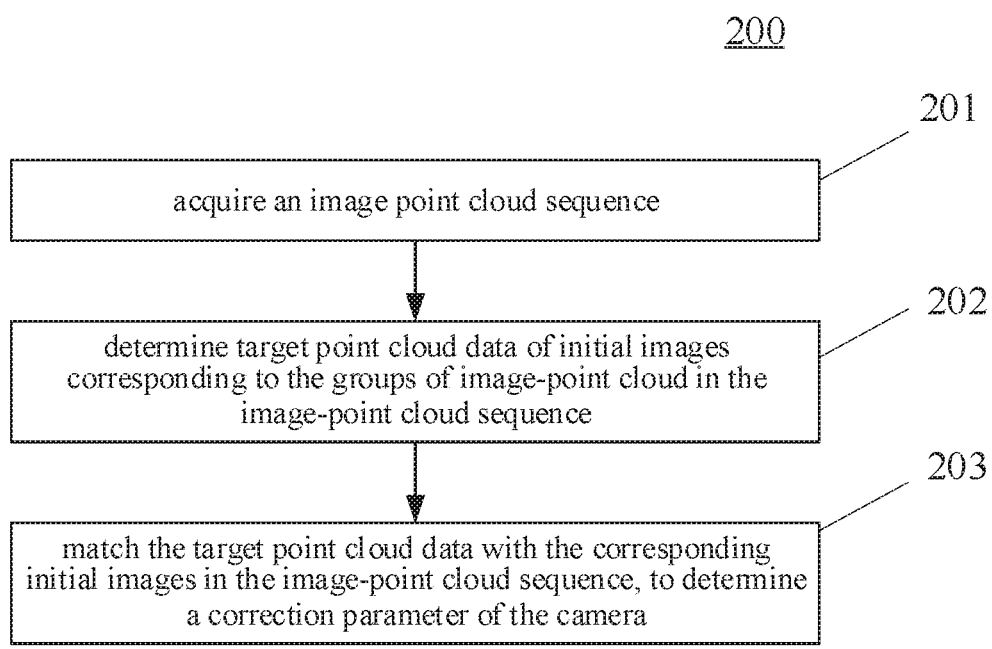
FIG. 2 is a flowchart of a method for calibrating a camera according to an embodiment of the present disclosure.

With further reference to FIG. 2, a process 200 of a method for calibrating a camera according to an embodiment of the present disclosure is shown. The method for calibrating a camera includes the following steps:

Step 201: acquiring an image-point cloud sequence.

In the present embodiment, the executing body (e.g., the server 105 shown in FIG. 1) of the method for calibrating a camera may acquire the image-point cloud sequence sent by the autonomous vehicles 101, 102, or 103 through wired connection or wireless connection. The autonomous vehicles 101, 102, and 103 are provided with devices such as a camera that acquires an image and a radar that acquires point cloud data. It should be noted that the wireless connection may include, but is not limited to, 3G/4G connection, WiFi connection, Bluetooth connection, WiMAX connection, Zigbee connection, UWB (Ultra Wideband) connection, and other wireless connections that are known at present or are to be developed in the future.

An existing vehicle is generally provided with a plurality of sensors. After a sensor is installed on the vehicle, it is usually necessary to calibrate various parameters of the sensor in a specific place. An in-vehicle camera on the vehicle is one of the sensors. When calibrating the camera, it is necessary to drive the vehicle to a plurality of specific locations in the specific place, and then acquire a current location of the vehicle by photographing an image using the camera or scanning a QR (Quick Response) code. A difference between the image, which is acquired by photographing using the camera or by scanning the QR code, and a standard image in an image library can be determined based on an actual location of the vehicle in the place, and then a to-be-modified parameter of the camera can be determined. However, each year there is a large number of vehicle models or different vehicles of a given vehicle model need to correct the in-vehicle camera, while the number of corresponding specific places is limited.

The executing body of the present disclosure can first acquire an image-point cloud sequence. The image-point cloud sequence may include at least one group of an initial image and point cloud data collected at the same time. The initial image is collected by a camera provided on the autonomous vehicle. The point cloud data is collected by a radar provided on the autonomous vehicle. That is, the point cloud data of the present disclosure is used for calibrating the camera on the autonomous vehicle.

In some alternative implementations of the present embodiment, the image-point cloud sequence may be collected by an approach of: the autonomous vehicle traveling along a straight line at a constant velocity, the camera provided on the autonomous vehicle collecting images at intervals of set time, and the radar provided on the autonomous vehicle collecting the point cloud data at intervals of said set time.

To achieve autonomous driving, the autonomous vehicles 101, 102, and 103 are generally provided with a device such as the radar that can acquire the point cloud data. The point cloud data are usually accurate enough to be used for correcting parameters of the camera. Specifically, the autonomous vehicles 101, 102, and 103 can travel along a straight line at a constant velocity on a road. In this process, the radar and the camera on the autonomous vehicles 101, 102, and 103 can collect point cloud data and images respectively at the same time at intervals of a set time. That is, the collected point cloud data and images have matching relationships.

Step 202: determining target point cloud data of initial images corresponding to groups of image-point cloud in the image-point cloud sequence.

Because the point cloud data and the images have the matching relationship, the parameters of the camera need to be corrected. Thus, the executing body can query the target point cloud data corresponding to the initial images based on the point cloud data. The target point cloud data may be point cloud data used for correcting the initial images.

In some alternative implementations of the present embodiment, the determining target point cloud data of the initial images corresponding to groups of image-point cloud in the image-point cloud sequence may include the following steps:

Step I: determining an actual traveling trajectory of the autonomous vehicle based on the image-point cloud sequence.

After acquiring the image-point cloud sequence, the executing body can match the image-point clouds contained in the image-point cloud sequence with existing point cloud data, to determine the actual traveling trajectory of the autonomous vehicles 101, 102 or 103.

Step II: determining location points corresponding to initial images in the groups of image-point cloud in the image-point cloud sequence on the actual traveling trajectory, to obtain a location point sequence corresponding to the image-point cloud sequence.

The point cloud data and the images have a matching relationship, and the parameters of the camera need to be corrected. Thus, it is necessary to determine locations on the actual traveling trajectory, i.e., the location points, of the autonomous vehicles 101, 102 or 103 when collecting initial images.

Step III: for a location point in the location point sequence, acquiring, at the location point, target point cloud data of a corresponding initial image.

After determining the location point, the executing body can acquire point cloud data at a location point in a three-dimensional space. The point cloud data are the target point cloud data of a corresponding to initial image.

In some alternative implementations of the present embodiment, the determining an actual traveling trajectory of the autonomous vehicle based on the image-point cloud sequence may include the following steps:

Step I: determining mark points of the autonomous vehicle in the three-dimensional space based on the point cloud data contained in the groups of image-point cloud in the image-point cloud sequence, to obtain a mark point sequence corresponding to the point cloud data.

Point cloud data are three-dimensional data, and may contain angle information of the three-dimensional data. Therefore, the executing body can annotate the point cloud data contained in each group of image-point cloud in the three-dimensional space, determine which objects are contained in the point cloud data, and then determine the mark points of the autonomous vehicle in the three-dimensional space.

Step II: fitting the mark points based on sorting of the mark points in the mark point sequence, to obtain the actual traveling trajectory of the autonomous vehicle.

After obtaining the mark points, the executing body can connect, by means of, e.g., fitting, the mark points to obtain a line, and then the line corresponds to the actual traveling trajectory of the autonomous vehicle.

In some alternative implementations of the present embodiment, the determining mark points of the autonomous vehicle in a three-dimensional space based on the point cloud data contained in each group of image-point cloud in the image-point cloud sequence may include: determining angle information of the point cloud data in the three-dimensional space, and determining the mark points of the autonomous vehicle in the three-dimensional space based on the angle information.

The point cloud data may contain the angle information. In combination with the angle information, the executing body can determine three-dimensional space points where the point cloud data is collected. The three-dimensional space points are the mark points of the autonomous vehicle in the three-dimensional space.

In some alternative implementations of the present embodiment, the determining location points corresponding to the initial images in the groups of image-point cloud in the image-point cloud sequence on the actual traveling trajectory may include: setting a mark point as a location point of the initial image in a corresponding group of image-point cloud.

The point cloud data and the images have the matching relationship, and the mark points are locations of the autonomous vehicle in the three-dimensional space corresponding to the point cloud data. Therefore, the executing body can directly set the mark points as the location points of the initial images in corresponding groups of image-point cloud.

In some alternative implementations of the present embodiment, the acquiring target point cloud data corresponding to the initial images at the location points may include: acquiring the target point cloud data at the mark points in the three-dimensional space. It is determined that the location point corresponds to an actual driving environment. The mark point may be considered as coordinate representation of a location point in the three-dimensional space. The executing body can acquire the point cloud data at the mark points, and the said point cloud data are the target point cloud data corresponding to the initial images.

Step 203: matching the target point cloud data with the corresponding initial images in the image-point cloud sequence, to determine a correction parameter of the camera.

The target point cloud data correspond to images that should be captured by the camera at locations of the corresponding initial images. The executing body can match the target point cloud data with the initial images to determine the correction parameter of the camera. The camera can be calibrated by correcting the parameter.

In some alternative implementations of the present embodiment, the matching the target point cloud data with the corresponding initial images in the image-point cloud sequence to determine a correction parameter of the camera may include the following steps:

Step I: acquiring a feature point set from the initial images.

In order to determine which parameters of the camera need to be corrected, the executing body can extract feature points from the initial images to obtain the feature points. The feature points may be points where a building profile, a road boundary line, and the like are marked in the initial images. For different image contents within the initial images, the feature points may be other types of points, which are not repeated one by one here.

Step II: determining, in the target point cloud data, at least one piece of point cloud feature data corresponding to the feature point set.

The target point cloud data correspond to the initial images, i.e., the target point cloud data contain point cloud data corresponding to image contents of the initial images. The executing body can determine, in the target point cloud data, at least one piece of point cloud feature data corresponding to the feature point set.

Step III: determining the correction parameter of the camera based on a locational relationship and an angular relationship between the at least one piece of point cloud feature data.

The target point cloud data are images that should be photographed by the camera at locations of the corresponding initial images. That is, the target point cloud data may be considered to correspond to the images acquired by the camera in the case where each parameter is well calibrated. Thus, the executing body can determine the correction parameter of the camera based on the locational relationship and the angular relationship between the at least one piece of point cloud feature data.

Figure 3:
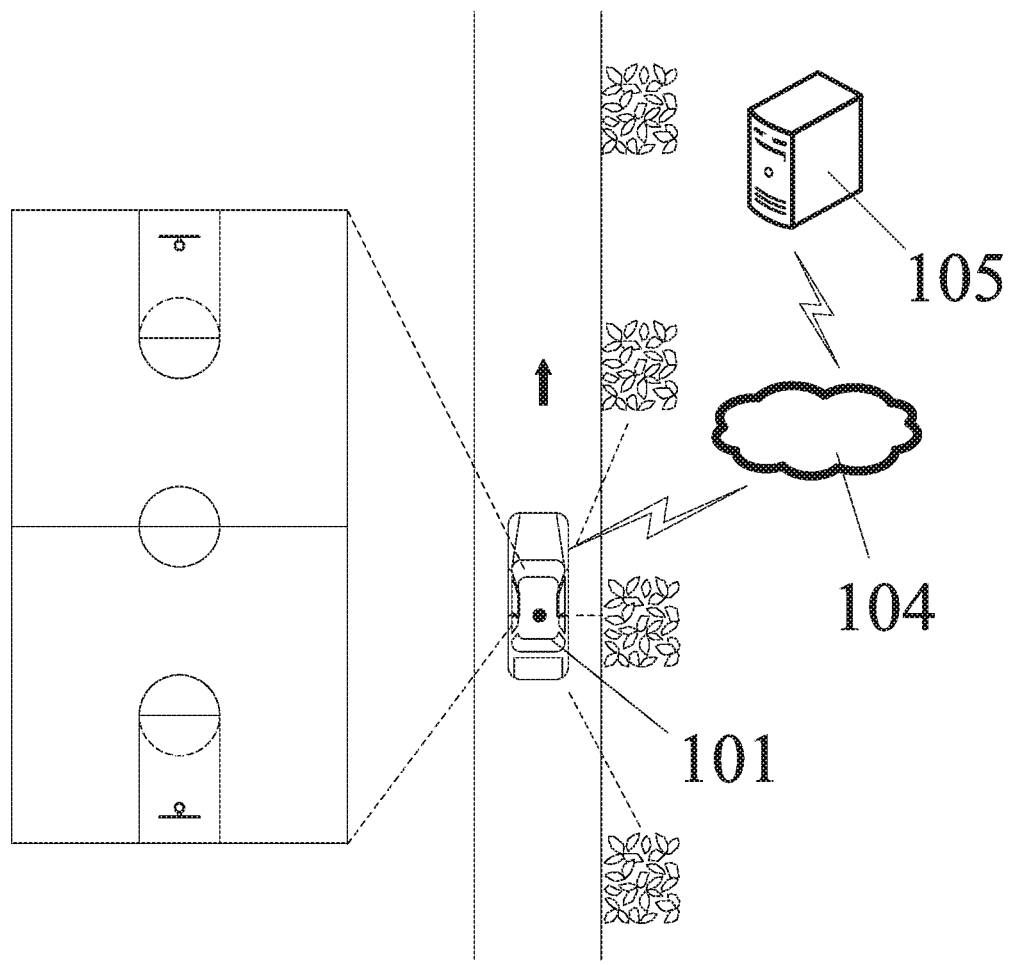
FIG. 3 is a schematic diagram of an application scenario of the method for calibrating a camera according to the present disclosure.

With further reference to FIG. 3, FIG. 3 is a schematic diagram of an application scenario of the method for calibrating a camera according to the present embodiment. In the application scenario of FIG. 3, the autonomous vehicle 101 acquires an image-point cloud sequence during traveling, and sends the image-point cloud sequence to the server 105 via the network 104. An image-point cloud includes images and point cloud data of a roadside tree and a basketball court. After receiving the image-point cloud sequence, the server 105 determines target point cloud data of initial images corresponding to groups of image-point cloud in the image-point cloud sequence, and then matches the target point cloud with the corresponding initial images in the image-point cloud sequence, to determine a correction parameter of the camera. Finally, the server 105 can send the correction parameter of the camera to the autonomous vehicle 101, such that the autonomous vehicle 101 corrects the parameter of the camera, to achieve calibrating the camera.

The method provided by the above embodiments of the present disclosure first acquires an image-point cloud sequence; then determines target point cloud data of the initial images corresponding to the groups of image-point cloud in the image-point cloud sequence; and finally matches the target point cloud data with the corresponding initial images in the image-point cloud sequence to determine a correction parameter of the camera. The method of the present disclosure can achieve calibrating the camera based on the point cloud data.

Figure 4:
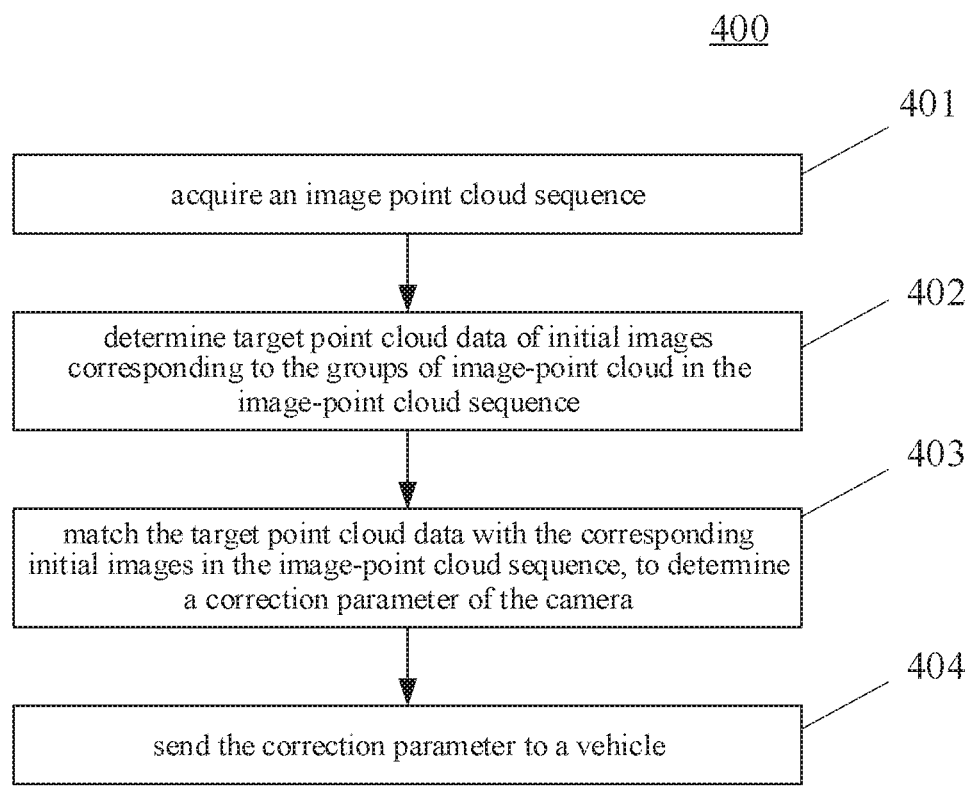
FIG. 4 is a flowchart of the method for calibrating a camera according to another embodiment of the present disclosure.

With further reference to FIG. 4, a process 400 of another embodiment of the method for calibrating a camera is shown. The process 400 of the method for calibrating a camera includes the following steps:

Step 401: acquiring an image-point cloud sequence.

In the present embodiment, an executing body (e.g., the server 105 shown in FIG. 1) of the method for calibrating a camera can acquire the image-point cloud sequence sent by the autonomous vehicles 101, 102, and 103 through wired connection or wireless connection.

The contents of step 401 are the same as the contents of step 201. The description will not be repeated here.

Step 402: determining target point cloud data of initial images corresponding to groups of image-point cloud in the image-point cloud sequence.

The contents of step 402 are the same as the contents of step 202. The description will not be repeated here.

Step 403: matching the target point cloud data with the corresponding initial images in the image-point cloud sequence, to determine a correction parameter of the camera.

The contents of step 403 are the same as the contents of step 203. The description will not be repeated here.

Step 404: sending the correction parameter to a vehicle.

After obtaining the correction parameter, the executing body can send the correction parameter to the vehicle. After receiving the correction parameter, the vehicle can correct a preset parameter of the camera, such that the camera can acquire images matching the point cloud data collected by a radar.

Figure 5:
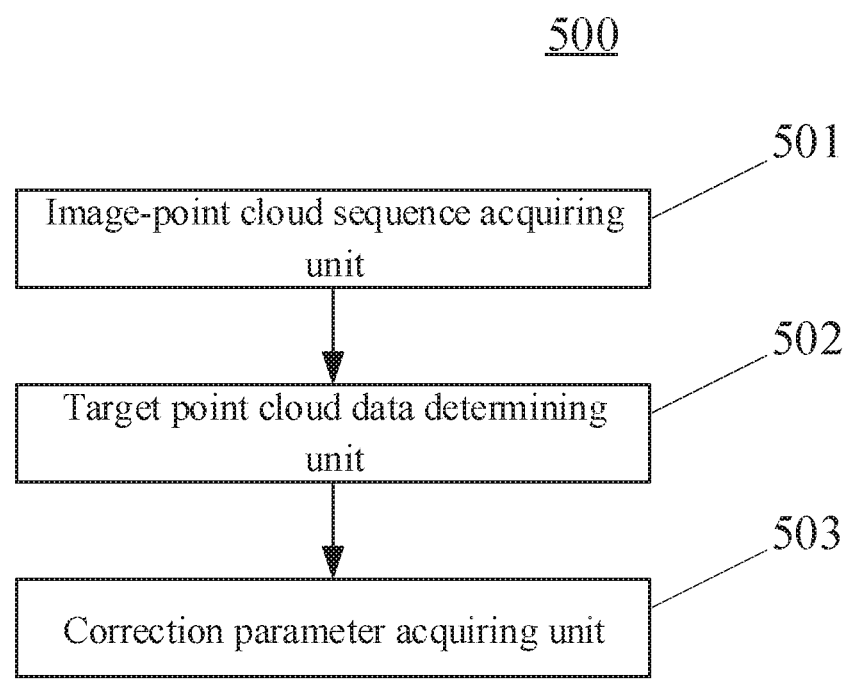
FIG. 5 is a schematic structural diagram of an apparatus for calibrating a camera according to an embodiment of the present disclosure.

With further reference to FIG. 5, as an implementation of the method shown in the above figures, an embodiment of the present disclosure provides an apparatus for calibrating a camera. The embodiment of the apparatus corresponds to the embodiment of the method shown in FIG. 2. The apparatus may be specifically applied to various electronic devices.

As shown in FIG. 5, the apparatus 500 for calibrating a camera of the present embodiment may include: an image-point cloud sequence acquiring unit 501, a target point cloud data determining unit 502, and a correction parameter acquiring unit 503. The image-point cloud sequence acquiring unit 501 is configured to acquire an image-point cloud sequence, the image-point cloud sequence including at least one group of an initial image and point cloud data collected at a same time, the initial image being collected by a camera provided on an autonomous vehicle, and the point cloud data being collected by a radar provided on the autonomous vehicle; the target point cloud data determining unit 502 is configured to determine target point cloud data of initial images corresponding to groups of image-point cloud in the image-point cloud sequence; and the correction parameter acquiring unit 503 is configured to match the target point cloud data with the corresponding initial images in the image-point cloud sequence, to determine a correction parameter of the camera.

In some alternative implementations of the present embodiment, the image-point cloud sequence may be collected by an approach of: the autonomous vehicle traveling along a straight line at a constant velocity, the camera provided on the autonomous vehicle collecting images at intervals of set time, and the radar provided on the autonomous vehicle collecting the point cloud data at intervals of said set time.

In some alternative implementations of the present embodiment, the target point cloud data determining unit 502 may include: an actual driving track determining subunit (not shown in the figure), a location point determining subunit (not shown in the figure), and a target point cloud data acquiring subunit (not shown in the figure). The actual driving track determining subunit is configured to determine an actual traveling trajectory of the autonomous vehicle based on the image-point cloud sequence; the location point determining subunit is configured to determine location points corresponding to the initial images in the groups of image-point cloud in the image-point cloud sequence on the actual traveling trajectory, to obtain a location point sequence corresponding to the image-point cloud sequence; and the target point cloud data acquiring subunit is configured to acquire, for a location point in the location point sequence, target point cloud data of a corresponding initial image at the location point.

In some alternative implementations of the present embodiment, the actual traveling trajectory determining subunit may include: a mark point determining module (not shown in the figure) and an actual driving track fitting module (not shown in the figure). The mark point determining module is configured to determine mark points of the autonomous vehicle in a three-dimensional space based on the point cloud data contained in the groups of image-point cloud in the image-point cloud sequence, to obtain a mark point sequence corresponding to the point cloud data; and the actual travel trajectory fitting module is configured to fit the mark points based on sorting of the mark points in the mark point sequence, to obtain the actual traveling trajectory of the autonomous vehicle.

In some alternative implementations of the present embodiment, the mark point determining module may include: an mark point determining submodule (not shown in the figure) configured to determine angle information of the point cloud data in the three-dimensional space, and determine the mark points of the autonomous vehicle in the three-dimensional space based on the angle information.

In some alternative implementations of the present embodiment, the location point determining subunit may include: a location point setting module (not shown in the figure) configured to set a mark point as the location point of the initial image in a corresponding group of image-point cloud.

In some alternative implementations of the present embodiment, the target point cloud data acquiring subunit may include: a target point cloud data acquiring module (not shown in the figure) configured to acquire the target point cloud data at the mark point in the three-dimensional space.

In some alternative implementations of the present embodiment, the correction parameter acquiring unit 503 may include: a feature point set acquiring subunit (not shown in the figure), a point cloud feature data determining subunit (not shown in the figure), and a correction parameter determining subunit (not shown in the figure). The feature point set acquiring subunit is configured to acquire a feature point set from the initial images; the point cloud feature data determining subunit is configured to determine, in the target point cloud data, at least one piece of point cloud feature data corresponding to the feature point set; and the correction parameter determining subunit is configured to determine the correction parameter of the camera based on a locational relationship and an angular relationship between the at least one piece of point cloud feature data.

The present embodiment further provides an electronic device, including: one or more processors; and a memory, storing one or more programs thereon, where the one or more programs, when executed by the one or more processors, cause the one or more processors to execute the method for calibrating a camera.

The present embodiment further provides a computer readable medium, storing a computer program thereon, where the program, when executed by a processor, implements the method for calibrating a camera.

Figure 6:
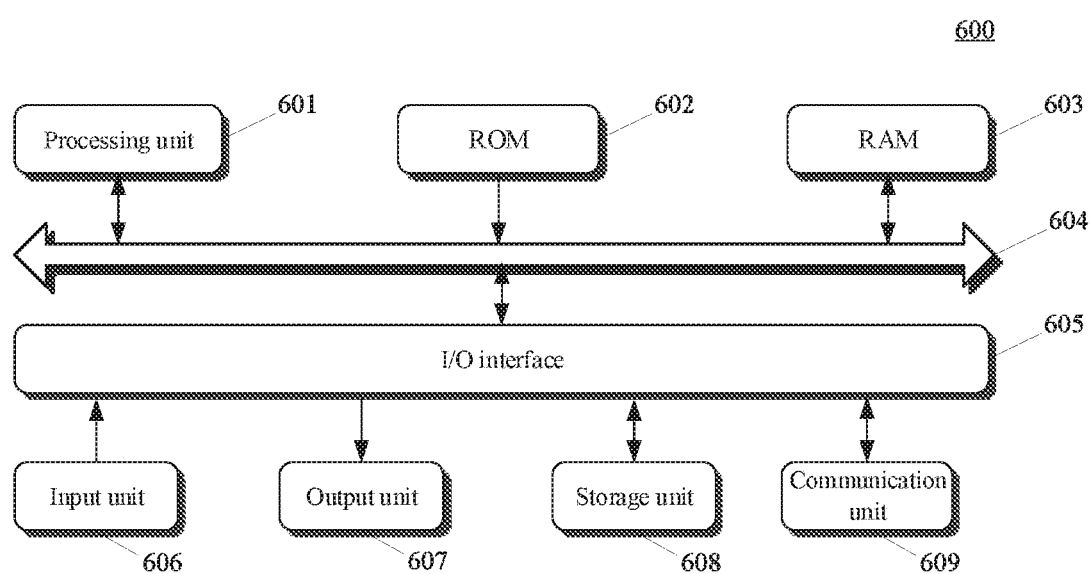
FIG. 6 is a schematic structural diagram adapted to implement an electronic device of embodiments of the present disclosure.

Referring to FIG. 6, a schematic structural diagram of an electronic device 600 (such as the server 105 shown in FIG. 1) adapted to implement some embodiments of the present disclosure is shown. The electronic device shown in FIG. 6 is only an example, and should not impose any limitation on the function and usage range of the embodiments of the present disclosure.

As shown in FIG. 6, the electronic device 600 includes a processing unit 601 (such as a central processing unit or a graphic processing unit), which may execute various appropriate actions and processes in accordance with a program stored in a read-only memory (ROM) 602 or a program loaded into a random access memory (RAM) 603 from a storage unit 608. The RAM 603 also stores various programs and data required by operations of the system 600. The CPU 601, the ROM 602 and the RAM 603 are connected to each other through a bus 604. An input/output (I/O) interface 605 is also connected to the bus 604.

Normally, the following components are connected to the I/O interface 605: an input unit 606 including a touch screen, a touch pad, a keyboard, a mouse, a camera, a microphone, an accelerometer, a gyroscope, etc.; an output unit 607 comprising a liquid crystal display device (LCD), a speaker, a vibrator etc.; a storage unit 608 including a magnetic tape, a hard disk and the like; and a communication unit 609. The communication unit 609 may allow the electronic device 600 to perform wired or wireless communication with other devices to exchange data. Although FIG. 6 shows the electronic device 600 having various units, it should be understood that it is not required to implement or have all the units shown. It may alternatively be implemented or provided with more or fewer units. Each block shown in FIG. 6 can represent one units or multiple units as needed.

In particular, according to embodiments of the present disclosure, the process described above with reference to the flow chart may be implemented in a computer software program. For example, an embodiment of the present disclosure includes a computer program product, which comprises a computer program that is hosted in a machine-readable medium. The computer program comprises program codes for executing the method as illustrated in the flow chart. In such an embodiment, the computer program may be downloaded and installed from a network via the communication unit 609, or may be installed from the storage unit 608, or may be installed from the ROM 602. The computer program, when executed by the processing unit 601, implements the above-mentioned functionalities as defined by the methods of the present disclosure.

It should be noted that the computer readable medium of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In some embodiments of the present disclosure, the computer readable storage medium may be any tangible medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The above described computer-readable storage medium may be the computer storage medium included in the electronic device in the above described embodiments, or a stand-alone computer-readable storage medium not assembled into the apparatus. The computer-readable storage medium stores one or more programs. The one or more programs, when executed by a device, cause the device to: acquire an image-point cloud sequence, the image-point cloud sequence including at least one group of an initial image and point cloud data collected at a same time, the initial image being collected by a camera provided on an autonomous vehicle and the point cloud data being collected by a radar provided on the autonomous vehicle; determine target point cloud data of initial images corresponding to groups of image-point cloud in the image-point cloud sequence; and match the target point cloud data with the corresponding initial images in the image-point cloud sequence, to determine a correction parameter of the camera.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising an image-point cloud sequence acquiring unit, a target point cloud data determining unit and a correction parameter acquiring unit, where the names of these units or modules do not in some cases constitute a limitation to such units or modules themselves. For example, the image-point cloud sequence acquiring unit may also be described as "a unit for acquiring an image-point cloud sequence."

The computer program code may include instructions that are executable by the processor to cause the processor to perform operations described by the instructions. The instructions may be stored on a non-transitory computer readable medium, and the processor may be included in the non-transitory computer readable medium. The processor included in the non-transitory computer readable medium may perform operations described by the instructions stored on the non-transitory computer readable medium.

The above description only provides an explanation of the preferred embodiments of the present disclosure and the technical principles used. It should be appreciated by those skilled in the art that the inventive scope of some embodiments of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in some embodiments of the present disclosure are examples.

What is claimed is:

1. A method for calibrating a camera provided on an autonomous vehicle, comprising:
   collecting, by the camera and a radar provided on the autonomous vehicle, groups of image-point cloud data, wherein each group of image-point cloud data includes an initial image and point cloud data collected at a same time, the initial image being collected by the camera provided on the autonomous vehicle and the point cloud data being collected by the radar provided on the autonomous vehicle;
   acquiring, from the camera and the radar, an image-point cloud sequence, the image-point cloud sequence including the groups of image-point cloud data;
   determining, after acquiring the image-point cloud sequence, an actual traveling trajectory line of the autonomous vehicle in a three-dimensional space based on the image-point cloud sequence;
   determining, on the actual traveling trajectory line, location points corresponding to the initial images in the groups of image-point cloud data in the image-point cloud sequence to obtain a location point sequence corresponding to the image-point cloud sequence;
   for a location point in the location point sequence, acquiring, at the location point, target point cloud data of a corresponding initial image; and
   matching the target point cloud data of the corresponding initial image with the corresponding initial image in the image-point cloud sequence, to determine a correction parameter of the camera,
   wherein the autonomous vehicle performs autonomous driving based on the point cloud data collected by the radar.

2. The method according to claim 1, wherein the image-point cloud sequence is collected through: the autonomous vehicle traveling along a straight line at a constant velocity, the camera provided on the autonomous vehicle collecting images at intervals of set time, and the radar provided on the autonomous vehicle collecting the point cloud data at the intervals of set time.

3. The method according to claim 1, wherein the method further comprises:
   calibrating the camera provided on the autonomous vehicle according to the correction parameter of the camera.

4. The method according to claim 1, wherein determining the actual traveling trajectory line of the autonomous vehicle based on the image-point cloud sequence comprises:
   determining mark points of the autonomous vehicle in a three-dimensional space based on the point cloud data contained in the groups of image-point cloud data in the image-point cloud sequence, to obtain a mark point sequence corresponding to the point cloud data; and
   fitting the mark points based on sorting of the mark points in the mark point sequence, to obtain the actual traveling trajectory line of the autonomous vehicle.

5. The method according to claim 4, wherein determining the mark points of the autonomous vehicle in the three-dimensional space based on the point cloud data contained in the groups of image-point cloud data in the image-point cloud sequence comprises:
   determining angle information of the point cloud data in the three-dimensional space, and determining the mark points of the autonomous vehicle in the three-dimensional space based on the angle information.

6. The method according to claim 4, wherein determining the location points corresponding to the initial images in the groups of image-point cloud data in the image-point cloud sequence on the actual traveling trajectory line comprises:
   setting a mark point as the location point of the initial image in each group of image-point cloud data.

7. The method according to claim 6, wherein acquiring, at the location point, target point cloud data of the corresponding initial image comprises:
   acquiring the target point cloud data at the mark point in the three-dimensional space.

8. The method according to claim 1, wherein matching the target point cloud data with the corresponding initial images in the image-point cloud sequence to determine the correction parameter of the camera comprises:
   acquiring a feature point set from the initial images;
   determining, in the target point cloud data, at least one piece of point cloud feature data corresponding to the feature point set; and
   determining the correction parameter of the camera, based on a locational relationship and an angular relationship between the at least one piece of point cloud feature data.

9. An apparatus for calibrating a camera, comprising:
   at least one processor; and
   a memory storing instructions that, when executed by the at least one processor, cause the at least one processor to perform operations, the operations comprising:
   collecting, by the camera and a radar provided on an autonomous vehicle, groups of image-point cloud data, wherein each group of image-point cloud data includes an initial image and point cloud data collected at a same time, the initial image being collected by the camera provided on the autonomous vehicle and the point cloud data being collected by the radar provided on the autonomous vehicle;

acquiring, from the camera and the radar, an image-point cloud sequence, the image-point cloud sequence including the groups of image-point cloud data;

determining, after acquiring the image-point cloud sequence, an actual traveling trajectory line of the autonomous vehicle in a three-dimensional space based on the image-point cloud sequence;

determining, on the actual traveling trajectory line, location points corresponding to the initial images in the groups of image-point cloud data in the image-point cloud sequence to obtain a location point sequence corresponding to the image-point cloud sequence;

for a location point in the location point sequence, acquiring, at the location point, target point cloud data of a corresponding initial image; and matching the target point cloud data of the corresponding initial image with the corresponding initial image in the image-point cloud sequence, to determine a correction parameter of the camera, wherein the autonomous vehicle performs autonomous driving based on the point cloud data collected by the radar.

10. The apparatus according to claim 9, wherein the image-point cloud sequence is collected through: the autonomous vehicle traveling along a straight line at a constant velocity, the camera provided on the autonomous vehicle collecting images at intervals of set time, and the radar provided on the autonomous vehicle collecting the point cloud data at the intervals of set time.

11. The apparatus according to claim 9, wherein the operations further comprise:
calibrating the camera provided on the autonomous vehicle according to the correction parameter of the camera.

12. The apparatus according to claim 9, wherein determining the actual traveling trajectory line of the autonomous vehicle based on the image-point cloud sequence comprises:
determining mark points of the autonomous vehicle in a three-dimensional space based on the point cloud data contained in the groups of image-point cloud data in the image-point cloud sequence, to obtain a mark point sequence corresponding to the point cloud data; and
fitting the mark points based on sorting of the mark points in the mark point sequence, to obtain the actual traveling trajectory line of the autonomous vehicle.

13. The apparatus according to claim 12, wherein determining the mark points of the autonomous vehicle in the three-dimensional space based on the point cloud data contained in the groups of image-point cloud data in the image-point cloud sequence comprises:
determining angle information of the point cloud data in the three-dimensional space, and determining the mark points of the autonomous vehicle in the three-dimensional space based on the angle information.

14. The apparatus according to claim 12, wherein determining the location points corresponding to the initial images in the groups of image-point cloud data in the image-point cloud sequence on the actual traveling trajectory line comprises:
setting a mark point as the location point of the initial image in each group of image-point cloud data.

15. The apparatus according to claim 14, wherein acquiring, at the location point, target point cloud data of the corresponding initial image comprises:
acquiring the target point cloud data at the mark point in the three-dimensional space.

16. The apparatus according to claim 9, wherein matching the target point cloud data with the corresponding initial images in the image-point cloud sequence to determine the correction parameter of the camera comprises:
acquiring a feature point set from the initial images;
determining, in the target point cloud data, at least one piece of point cloud feature data corresponding to the feature point set; and
determining the correction parameter of the camera based on a locational relationship and an angular relationship between the at least one piece of point cloud feature data.

17. A non-transitory computer readable medium, storing a computer program thereon, wherein the computer program, when executed by a processor, causes the processor to perform operations, the operations comprising:
collecting, by a camera and a radar provided on an autonomous vehicle, groups of image-point cloud data, wherein each group of image-point cloud data includes an initial image and point cloud data collected at a same time, the initial image being collected by the camera provided on the autonomous vehicle and the point cloud data being collected by the radar provided on the autonomous vehicle;
acquiring, from the camera and radar, an image-point cloud sequence, the image-point cloud sequence including the groups of image-point cloud data;
determining, after acquiring the image-point cloud sequence, an actual traveling trajectory line of the autonomous vehicle in a three-dimensional space based on the image-point cloud sequence;
determining, on the actual traveling trajectory line, location points corresponding to the initial images in the groups of image-point cloud data in the image-point cloud sequence to obtain a location point sequence corresponding to the image-point cloud sequence;
for a location point in the location point sequence, acquiring, at the location point, target point cloud data of a corresponding initial image; and
matching the target point cloud data of the corresponding initial image with the corresponding initial image in the image-point cloud sequence, to determine a correction parameter of the camera,
wherein the autonomous vehicle performs autonomous driving based on the point cloud data collected by the radar.

18. The non-transitory computer readable medium according to claim 17, wherein the image-point cloud sequence is collected through: the autonomous vehicle traveling along a straight line at a constant velocity, the camera provided on the autonomous vehicle collecting images at intervals of set time, and the radar provided on the autonomous vehicle collecting the point cloud data at the intervals of set time.

19. The non-transitory computer readable medium according to claim 17, wherein the operations further comprise:
calibrating the camera provided on the autonomous vehicle according to the correction parameter of the camera.

20. The non-transitory computer readable medium according to claim 17, wherein determining the actual traveling trajectory line of the autonomous vehicle based on the image-point cloud sequence comprises:
  determining mark points of the autonomous vehicle in a three-dimensional space based on the point cloud data contained in the groups of image-point cloud data in the image-point cloud sequence, to obtain a mark point sequence corresponding to the point cloud data; and
  fitting the mark points based on sorting of the mark points in the mark point sequence, to obtain the actual traveling trajectory line of the autonomous vehicle.

* * * * *